Patented Dec. 1, 1925.

1,563,853

UNITED STATES PATENT OFFICE.

WILLIAM A. HARTY, OF BLASDELL, NEW YORK.

REFRACTORY MATERIAL AND METHOD OF PRODUCING THE SAME.

No Drawing. Application filed November 18, 1921. Serial No. 516,226.

*To all whom it may concern:*

Be it known that I, WILLIAM A. HARTY, a citizen of the United States, residing at Blasdell, county of Erie, State of New York, have invented certain new and useful Improvements in Refractory Materials and Methods of Producing the Same, of which the following is a specification.

This invention relates to a new commercial product and to the method of producing the same commercially. The particular product involved is in reality pure or essentially pure silica in a fused state. This product has certain immediate uses and a great number of potential uses in the industries. It is adapted to take the place of other forms of silica in some of the industries, as well as a substitute for other substances in other industries.

My material as above stated is pure or substantially pure silica in a fused state. In such a state it is substantially the equivalent of the pure quartz in nature, that is, it is substantially silicon dioxide but in the amorphous or noncrystalline form and having very different physical properties from the crystalline quartz found in nature.

I have discovered that it is possible to produce the fusion of silica into a mass without substantial impurity by fusing it in an electric furnace while keeping it isolated from the electrically heated core by a strata or layer of a heat resistant such as silicon carbide.

In producing my product, I preferably employ an electric furnace of the resistor type and for this purpose have employed such a furnace as is used in making silicon carbide. I fill such furnace with a layer of sand and over this place a layer of amorphous silicon carbide. Over this is put the graphite core of the furnace and the core and silicon carbide are then blanketed or covered with the usual covering mixture employed in making the silicon carbide. The energy is then introduced into the furnace and maintained from 5 to 12 hours, the furnace taking anywhere from 450 to 650 kilowatts per hour and the silica is fused at the temperature maintained which is about 1800° C.

The fused silica forms as a slab somewhat crescent shape in cross section and forming beneath the core usually approximately about ⅛ of a circle of the length of the core.

There is sometimes formed on the inner face of this slab of fused silica next to the carbon core, a small layer of silicon carbide which can be chipped off leaving the slab of substantially pure fused silica. This slab is then broken up and screened to the desired size.

The variety of uses is great. My product may be used as a grog in saggers used in making porcelain, enormously prolonging their life in service or in a variety of refractory articles.

The method which I have referred to may be variously modified in its practice, although that described is the best known to me and the most successful that I have found.

Various modifications in the method and any modification in the resultant product is therefore to be considered within the scope of my invention if within the limits of the appended claims.

What I therefore claim and desire to secure by Letters Patent is:

1. The method of producing fused substantially pure silica consisting in fusing sand in an electric furnace beneath an isolating layer of amorphous or crystalline silicon carbide.

2. The method of producing fused substantially pure silica in a mass, consisting in arranging in an electric furnace a bed of sand and an isolating layer of amorphous silicon carbide with a graphite core, in blanketing the same and in energizing the core.

3. The method of producing fused substantially pure silica in a mass, consisting in forming in an electric furnace a bed of sand, and an isolating overlying strata of amorphous or crystalline silicon and in energizing the furnace.

4. The method of producing substantially pure silica in a fused state, consisting in fusing a body sand isolated from the graphite core by a layer of amorphous or crystalline silicon carbide.

5. That step in the method of producing fused substantially pure silica in an electric furnace which consists in isolating the sand from the graphite core of the furnace by a layer of amorphous or crystalline silicon carbide.

6. As a new commercial product of the electric furnace, substantially pure silica in fused state.

7. As a new commercial product of the electric furnace, substantially pure silica in fused state derived from sources other than natural silica in fused state.

8. The method of producing substantially pure silica which consists in arranging in an electric furnace of the resistor type a layer of sand and an overlying layer of amorphous silicon carbide, in covering the same with a loose graphite core, in blanketing the core, and in energizing the core.

9. As a new product of commerce, a mass of substantially pure silica in an artificially fused state.

10. As a new product of commerce, pure silica in an artificially fused state.

11. As a new product of commerce, a mass of substantially pure silica in fused state.

In testimony whereof I affix my signature.

WILLIAM A. HARTY.